UNITED STATES PATENT OFFICE.

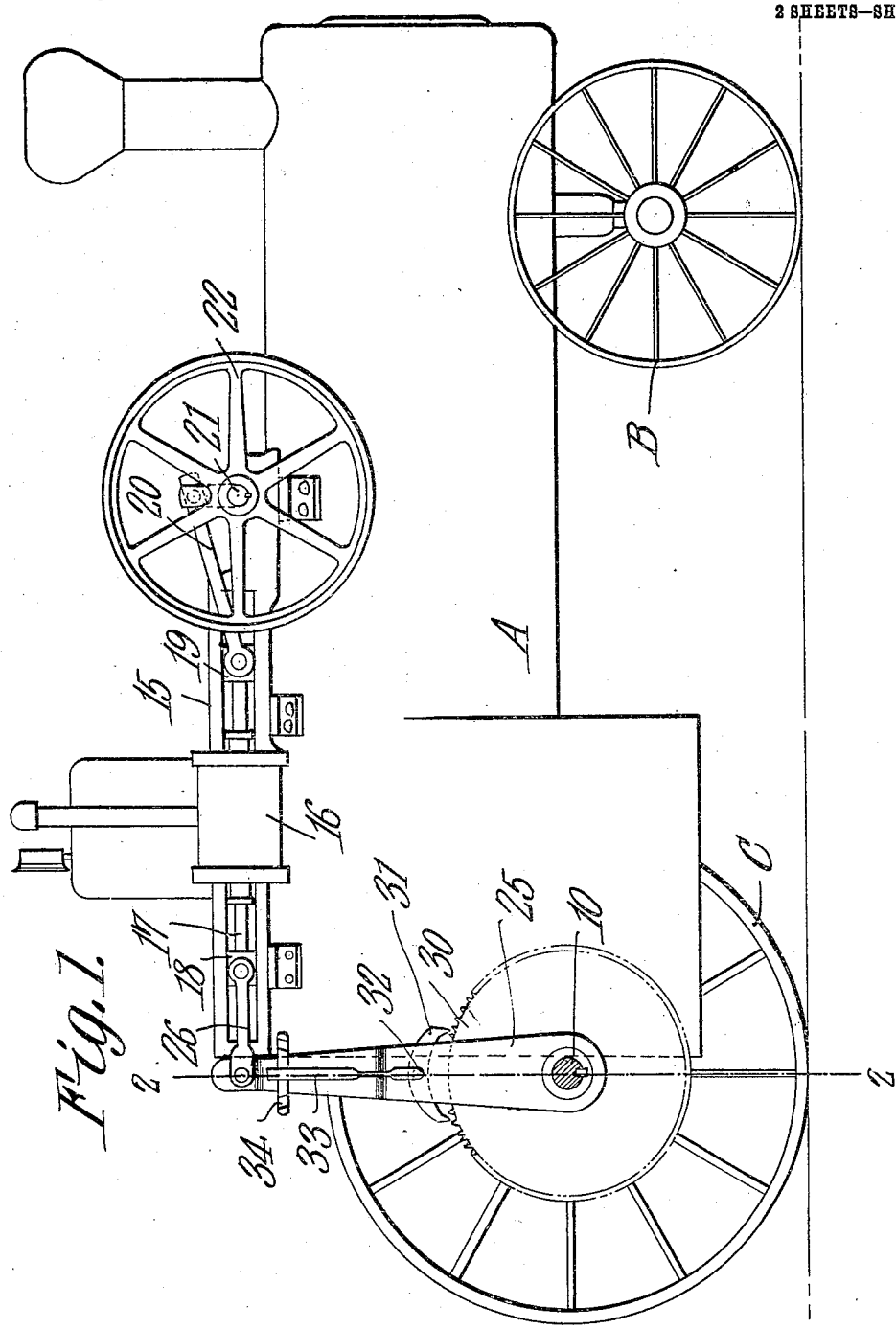

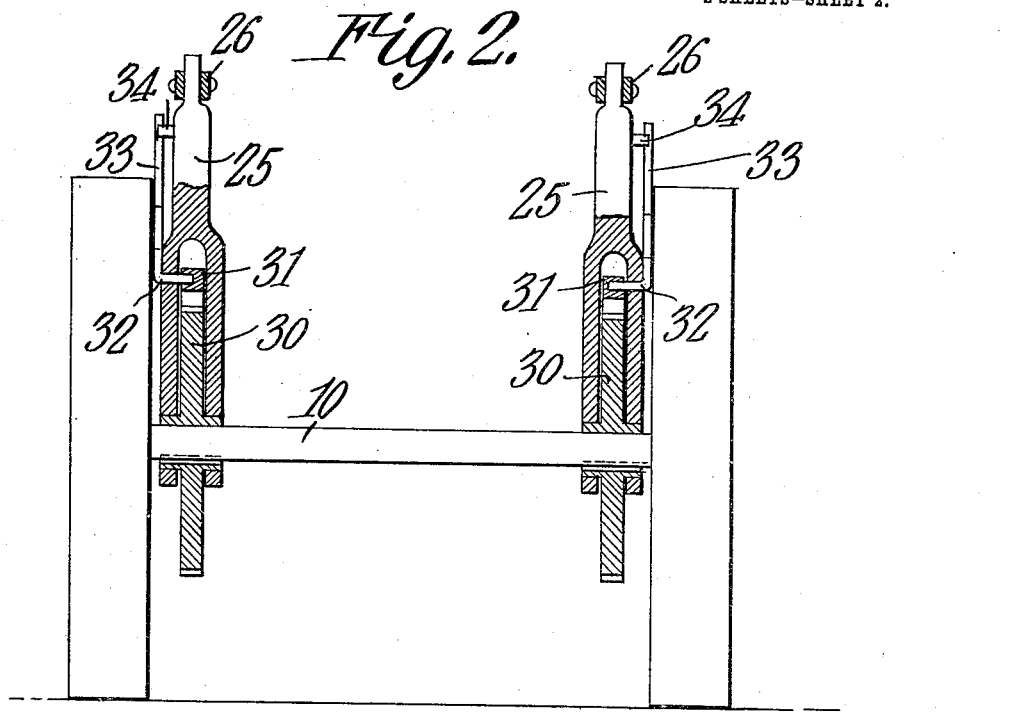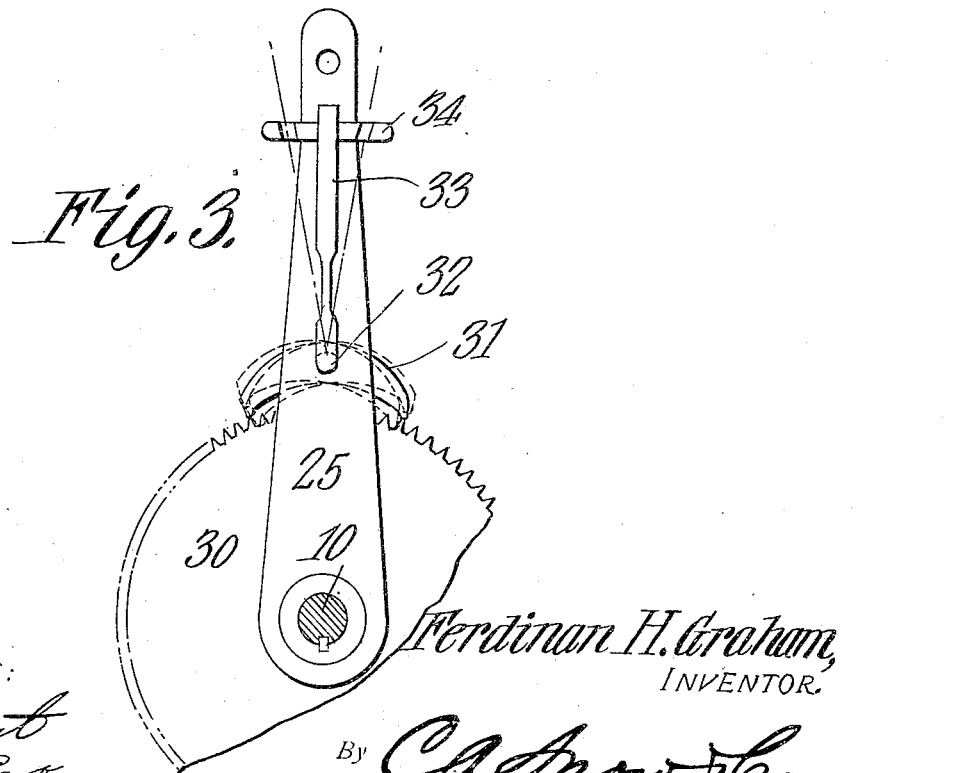

FERDINAN H. GRAHAM, OF EVERGREEN, COLORADO.

TRACTION-ENGINE.

931,753.  Specification of Letters Patent.  Patented Aug. 24, 1909.

Application filed April 19, 1907. Serial No. 369,130.

*To all whom it may concern:*

Be it known that I, FERDINAN H. GRAHAM, a citizen of the United States, residing at Evergreen, in the county of Jefferson and State of Colorado, have invented a new and useful Traction-Engine, of which the following is a specification.

This invention relates to propelling mechanism for traction engines and the like, and has for its principal object to provide a mechanism of simple and economical construction which may be readily adjusted for the purpose of forward or backward propulsion, or to an idle position.

A further object of the invention is to provide a propelling mechanism in which a ratchet wheel is secured to one of the rear wheels or the rear wheel axle and is engageable by an adjustable pawl that is carried by an engine operated lever, the pawl being so mounted as to permit adjustment for either forward or backward movement without stopping or reversing the engine or to an idle position, so that the driving movement may be stopped without stopping the engine.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a side elevation of a traction engine provided with a propelling means constructed in accordance with the invention. Fig. 2 is a transverse sectional view of the same on the line 2—2 of Fig. 1. Fig. 3 is a detail view showing the adjustment of the operating pawl for either forward or backward propulsion or to idle position.

Similar characters of reference are employed to indicate corresponding parts throughout the several figures of the drawings.

In the drawing, the traction engine or vehicle A may be of any ordinary construction and is provided with forward wheels B and rear wheels C, the latter being rigidly secured to an axle 10.

On top of the boiler or frame of the engine are arranged two engines 15, each including a cylinder 16, having a piston that is connected to a piston rod 17, the latter extending through both heads of the cylinder and being provided with two cross heads 18 and 19 adapted to suitable cross head guides. The forward cross heads 19 are connected by heads 20 to the crank shaft 21 which carries as usual a belt wheel 22 from which power may be transmitted for the operation of agricultural machinery or for other purposes.

Pivoted on the axle 10 are two levers 25 said levers being free to swing in both directions, and their upper ends being connected to the cross heads 18 by small rods 26, so that as the engine is operated, the levers 25 will be oscillated. The connections are so made that as one lever moves forward the other moves to the rear, and vice versa.

Each of the levers 25 is bifurcated and straddles a ratchet wheel 30 that is keyed or otherwise secured to the shaft 10, and in the bifurcated portion of the lever is hung a double pawl 31 having teeth at each end. The pawl carrying shaft 32 is extended to one side of the lever, and is provided with an arm 33 which may be adjusted to any one of three notches in a quadrant 34 that is carried by lever 25. When in the mid position, both of the teeth of the pawl are out of engagement with the ratchet wheel, and the levers 25 may be freely oscillated without stopping the movement of the engine, and without imparting any propelling movement to the vehicle. When moved to the forward notch, the engine will operate to propel the machine forward, and when the arms 33 are moved to the rearmost notch, the engine will operate to move the machine rearward. The connections are readily shifted, even while the engine is operating, and as the pawls of the two levers act alternately, the driving movement in both directions is practically continuous. The mechanism is further advantageous in that when the pawl is moved to idle position the engines may be run for the purpose of driving the crank shaft 21, while the levers swinging freely on the axle 10 offer but little frictional resistance to the movement.

It will be observed from an inspection of the several figures of the drawing that the arms 33 of the pawl 31 are reduced in thickness throughout their intermediate portions so that upon return movement of the levers 25, one end or the other of the pawl will ride over several of the teeth of the ratchets 30 to obtain a fresh purchase thereon, the rocking movement of the pawl necessary to permit of such travel thereof over the teeth being against the resiliency of the reduced portion of the corresponding arm 33.

I claim:—

1. In mechanism for imparting continuous propelling movement to traction engines, a rear axle having supporting wheels rigidly secured thereto, a pair of toothed wheels rigidly secured to the axle at points adjacent the supporting wheels, a pair of bifurcated levers straddling the toothed wheels, and pivotally mounted on the hubs thereof, a rock shaft carried by each of the levers, a double pawl secured to each of the shafts constructed to propel the said traction engine continuously forwardly or rearwardly, a spring arm carried by the shaft and movable to engage either end of the pawl with the gear or to move said pawl to an idle position, a notched quadrant arranged to hold the lever in adjusted position, a pair of alternately acting engines mounted at the upper portion of the traction engine, and each including a cross head, and cross head guides, and connecting rods extending from the cross heads to the pawl carrying levers, whereby said levers are alternately moved to impart continuous driving movement to the rear axle.

2. In a mechanism of the class described, a vehicle axle, a ratchet fixed upon the axle and formed with a hub projecting from each side thereof, a yoke formed in the lower end of its arms with bearings loosely receiving the said hub of the ratchet, a yieldable lever provided with a shaft portion journaled to rock in one arm of the yoke, a locking device for the lever carried by the said yoke, a pawl carried by the shaft portion of the lever and adapted to be rocked thereby, the said ratchet having but a single series of teeth, the said pawl being confined between the arms of the yoke and having a tooth at each end, the said teeth of the pawl being both in the same plane and in a plane with the ratchet, and means connected to the yoke for rocking the same.

In testimony that I claim the foregoing as my own, I have hereto affixed my signature in the presence of two witnesses.

FERDINAN H. GRAHAM.

Witnesses:
HENRY POWER,
WILLARD S. BEACH.